United States Patent Office 3,357,957
Patented Dec. 12, 1967

3,357,957
VULCANIZATION PROCESS FOR RUBBER
Norman Gunning Bromby and David Buchanan Wootton, Manchester, England, assignors to Imperial Chemical Industries Limited, London, England, a corporation of Great Britain
No Drawing. Filed May 27, 1963, Ser. No. 283,527
Claims priority, application Great Britain, June 1, 1962, 21,193/62
11 Claims. (Cl. 260—79.5)

This invention relates to an improved vulcanization process for rubber, and more particularly to the use of certain quaternary ammonium salts as scorch retarding agents during the processing of rubber.

During the compounding operations to which a rubber stock containing a vulcanizing agent and accelerator may be subjected before vulcanization is carried out, some degree of premature vulcanization, known as "scorching" may take place. This tendency to scorch is particularly great if the stock contains certain carbon blacks, especially furnace carbon blacks.

The danger of scorching can be reduced by incorporation into the rubber stock of certain nitrosoamines, but retarders of this type are liable to produce porous vulcanizates under certain circumstances and further may lead to discolouration of the vulcanized rubber and materials with which these come in contact. They also may have an adverse effect on rate of cure. Other retarders which are free of staining and porosity defects are exemplified by acidic substances such as salicylic acid and phthalic anhydride. However, these acidic substances are less effective than the nitrosoamine type and also have an adverse effect on the rate of cure.

We have now found that vulcanizable rubber compositions can be processed with a high margin of safety against scorching and then vulcanized to give vulcanizates with excellent physical properties if there is incorporated into the composition certain quaternary ammonium salts in which the nitrogen atom is connected directly to at least one aromatic nucleus. These quaternary ammonium salts are very effective retarders of premature vulcanization, do not lead to stained or porous vulcanizates, and, when used in the appropriate amounts, have less effect on the rate of cure than other retarders.

According to our invention therefore there is provided an improved process for the vulcanization of rubber by heating with sulphur or a sulphur-bearing substance, a vulcanization accelerator, and a retarder, characterised in that the retarder is a quaternary ammonium salt wherein the quaternary nitrogen atom is connected directly to an aryl nucleus, and directly to a second aryl nucleus or through a methylene or substituted methylene group to an aryl nucleus, and to groups which may be the same or different and which are chosen from substituted or unsubstituted alkyl, alkenyl, cycloalkyl and aralkyl groups or which are joined and together with the nitrogen atom form a heterocyclic ring.

As rubbers which may be vulcanized by the process of our invention there may be mentioned natural rubber and synthetic rubbers such as polymers, including stereo specific polymers such as cispolymers, of butadiene, 2-methylbutadiene, 2-chlorobutadiene, and isobutene, and copolymers of these compounds with each other and with acrylonitrile, styrene, methyl methacrylate, and other well-known polymerisable compounds which may be used for the manufacture of these rubbers, and mixtures of these polymers.

The sulphur or sulphur-bearing substances should preferably be used in the amounts conventional in vulcanization, that is from 0.5 to 5.0% of the weight of rubber in the case of sulphur and from 1.0 to 5.0% in the case of a sulphur-bearing substance. As sulphur-bearing substances there may be mentioned for example amine polysulphides.

As accelerators for use in the process of our invention there may be mentioned for example thiazoles such as mercaptobenzthiazole, mercaptobenzthiazyl disulphide and the zinc salt of mercaptobenzthiazole, amine/aldehyde condensates such as butyraldehyde/aniline, ethylchloride/formaldehyde/ammonia, and p-toluidine/formaldehyde condensates, and especially guanidines such as diphenylguanidine and di-o-tolylguanidine and sulphenamides such as benzthiazylsulphencyclohexylamide, benzthiazylsulphen-tert.-octylamide, benzthiazylsulphen-tert.-butylamide, benzthiazylsulphenmorpholide, benzthiazylsulphendicyclohexylamide, benzthiazylsulphenisopropylamide, benzthiazylsulphendiisopropylamide, benzthiazylsulphin dimethylamide and dimethylthiocarbamyl-tert.-octylsulphenamide, and mixtures of these accelerators. There may also be used mixtures of one or more of these accelerators with minor amounts of other accelerators such as tetramethylthiuramdisulphide, tetraethylthiuramdisulphide, tetramethylthiuram monosulphide, or di-$N:N'$-cyclopentamethylenethiuram disulphide, or salts of dialkyl or alkylaryl dithicarbamic acids with metals such as zinc, copper, bismuth, lead, nickel, sodium, or tellurium or with organic bases such as diethylamine. The amount of accelerator is preferably from 0.1% to 5% of the weight of rubber.

As aryl groups to which the quaternary nitrogen atom is attached directly or may be attached through a methylene or substituted methylene group there may be mentioned preferably phenyl and also naphthyl, diphenyl, tetrahydronaphthyl, indenyl, benzoxazyl, carbazyl and other homocyclic and heterocyclic aryl groups containing one or more aromatic nuclei. Where the aryl group contains more than one aromatic nuuleus these nuclei may be fused or may be linked directly or by means of one or more atoms of carbon, oxygen, nitrogen or sulphur.

The aryl group may be substituted by groups such as alkyl, preferably containing not more than nine carbon atoms, substituted alkyl, alkenyl, substituted alkenyl, halogen, hydroxyl, alkoxy, nitro and sulphonic acid.

As substituted methylene groups which may join the nitrogen atom to an aromatic nucleus there may be mentioned ethylidene, propylidene and isopropylidene.

As alkyl groups to which the nitrogen atom may be attached there may be mentioned any alkyl group, but preferably a lower alkyl group such as the propyl, isopropyl, butyl or amyl group, but particularly the methyl or ethyl group.

As substituted alkyl groups to which the nitrogen atom may be attached there may be mentioned especially for example hydroxy alkyl groups such as $\beta$-hydroxyethyl and $\beta$-hydroxypropyl, and hydroxypolyether groups such as hydroxypolyalkyleneoxy groups derived from these hydroxyalkyl groups. Quaternary ammonium salts containing these groups are new compounds. They are however readily available, since the intermediate tertiary amines are easily manufactured from the corresponding secondary amines and alkylene oxides such as ethylene oxide, propylene oxide or butyleneoxide. Other substituted alkyl groups which may be present in the quaternary ammonium salts of the invention include β-methoxyethyl, β-ethoxyethyl, β-methoxypropyl, β-acetoxyalkyl, β-cyanoalkyl, and alkyl groups containing substituents such as sulphonic acid, sulphato or carboxyl groups which may serve to quaternise the nitrogen atom of the quaternary ammonium salt or a second nitrogen atom.

As alkenyl groups which may be attached to the nitrogen atom there may be mentioned for example the allyl, vinyl, propenyl and methallyl groups, and substituted derivatives thereof.

As cycloalkyl groups which may be attached to the nitrogen atom there may be mentioned for example the cyclopentyl and cyclohexyl groups. The cycloalkyl groups may carry alkyl substituents but the number of carbon atoms in the cycloalkyl ring should not exceed 8.

As aralkyl groups which may be attached to the nitrogen atom there may be mentioned any aryl group as hereinbefore defined attached to the nitrogen atom by an aliphatic chain which may be a methylene or substituted methylene group as hereinbefore defined or longer aliphatic chains which may be saturated or unsaturated.

As examples of heterocyclic rings which may be formed by the nitrogen atom and the two substituent groups when these groups are joined there may be mentioned the pyrrolidine, piperidine, hexamethyleneimine and morpholine rings.

As examples of cations of the quaternary ammonium salts which may be used in the process of our invention there may be mentioned benzyldimethyl-p-tolyammonium, p-nitrobenzyldimethylphenyl ammonium, diphenyldimethylammonium, m-sulphobenzyl-p-formlyphenyldimethylammonium, m - sulphobenzyl - m - nitrophenyldimethylammonium, benzyldimethyl - m - nitrophenylammonium, benzylmethylphenyl - β - sulphatoethylammonium, N-[β-(N-methylanilino)ethyl]benzylmethylphenylammonium, 3:5-ditert.-butyl-2-hydroxybenzyldimethylphenylammonium, benzyldimethyl-p-methoxyphenylammonium, p-xylydimethylphenylammonium, N - benzyl-1:2:2:4-tetramethyl-1:2-dihydroquinolinium, N-benzyl-6-alkyl-1:2:2:4-tetramethyl-1:2 - dihydroquinolinium for example where the alkyl group is methyl or ethyl, N-benzyl-6-alkoxy-1:2:2:4-tetramethyl-1:2 - dihydroquinolinium for example where the alkoxy group is methoxy or ethoxy, dibenzylphenylmethylammonium, benzyldiethylphenylammonium, and allylbenzylmethylphenylammonium and especially benzyldimethylphenylammonium and benzylmethylethylphenylammonium since these two compounds are particularly effective retarders and are easily prepared from readily available materials.

There may also be particularly mentioned cations derived from the above-mentioned cations by replacement of an N-alkyl group by a group such as a hydroxyalkyl group where the alkyl group may contain 2, 3 or 4 carbon atoms, or a hydroxyalkoxyalkyl group where the alkoxy and alkyl groups may each contain 2, 3 or 4 carbon atoms, or a hydroxypolyalkenoxyalkly group where the alkylene and alkly groups may each contain 2, 3 or 4 carbon atoms, or mixtures of these. As examples of this class of cation there may be mentioned benzyl-β-hydroxyethylmethylphenylammonium, benzyl-(β-hydroxyethoxyethyl)methylphenylammonium, benzyl-(β-hydroxyethoxyethoxyethyl)methylphenylammonium, benzyl-p-hydroxypropylmethylphenylammonium, benzyl-(β-hydroxypropoxypropyl)methylphenylammonium, benzyl - (β - hydroxyethoxypropyl)methylphenylammonium, benzyl-(β-hydroxypropoxyethyl)methylphenylammonium, and other similar benzyl(hydroxypolyalkylenoxyalkyl)alkylphenylammonium cations containing longer polyalkyeneoxy chains. Quaternary ammonium salts containing these hydroxy alkyl cations or derived cations are new compositions of matter and are of particular value since the toxic hazards associated with their use in the rubber industry is less than with quaternary ammonium salts not containing these cations.

There may also be used cations containing two quaternary nitrogen atoms which are linked by one or more aliphatic chains, aromatic rings, or heteroatoms or combinations of these. One at least of the quaternary nitrogen atoms must be connected directly to an aryl nucleus and directly or through a methylene or substituted methylene group to an aryl nucleus. The linking group may be for example an aliphatic chain which may be interrupted by one or more heteroatoms such as oxygen as in quaternaries based on di-β-aminoethyl ether, sulphur or nitrogen in an imino group which may be substituted by a hydrocarbon or substituted hydrocarbon group. The linking group may be an aromatic ring, for example m- or p-phenylene, or two or more aromatic rings or groups which may be fused together as in naphthalene or joined directly as in diphenyl or through one or more aliphatic chains or heteroatoms or combinations of these, for example a sulphur atom or a disulphite, sulphoxide or sulphone group, an oxygen atom, a carbonyl group, an imino group, or substituted imino group, carbinol group, diamido group derived from an aliphatic or aromatic dicarboxylic acid, or urea group, or an aliphatic chain which may be interrupted by heteroatoms as described hereinbefore; linkages such as methylene, isopropylidene and cyclohexylidene groups are readily introduced by interaction of two molecular proportions of an aromatic amine and an aldehyde or ketone, such as formaldehyde, acetone, or cyclohexanone, and afford particularly valuable quaternary ammonium salts. The two nitrogen atoms may be joined to aliphatic chains which are joined to a common aromatic ring, as for example in quaternaries derived from p-xylylenedichloride or bis-2:6-chloromethyl-4-alkyl phenol, or may be fused together, joined directly, or joined through one or more aliphatic chains or hetero atoms or combinations of these; particular examples of such bisquaternaries are those obtained from the bis-chloromethyl derivatives of diphenyl sulphides such as 3:3'-dimethyl-4:4'-dihydroxydiphenyl sulphide and the corresponding disulphide. Similar compounds to those hereinbefore described but containing three or more quarternary ammonium groups may also be used.

As examples of cations containing two or more quaternary nitrogen atoms there may be mentioned p-xylylenebis(dimethylphenylammonium, 1:1 - bis[4 - (N-benzyl-N:N-dimethylammonio)phenyl]methane, 1:1-bis[4-(N-benzyl-N:N-diethylammonio)phenyl]methane, 1:1-bis[4-(N-benzyl-N:N - dimethylammonio)phenyl]cyclohexane, 2:2-bis[-4-(N-benzyl - N:N - dimethylammonio)phenyl]propane, di-[4-(N-benzyl-N:N-dimethylammonio)phenyl]carbinol, bis[4 - (N - benzyl-N:N-dimethylammonio)phenyl]sulphide, 4:4'-di(N-benzyl - N:N - dimethylammonio)triphenylmethane, 4:4':4''-tris(N-benzyl-N:N-dimethylammonio)triphenylmethane, and m-phenylene bis (benzyldimethylammonium).

In particular may be mentioned cations containing two quarternary nitrogen atoms in which the two nitrogen atoms are linked by a saturated or unsaturated alkylene chain which may also contain one or more heteroatoms or groups, such as 1:2-ethylene bis(benzylmethylphenylammonium), 1:3-trimethylene bis(benzylmethylphenylammonium), 1:4 - but - 2-en-bis(benzylmethylphenylammonio), β - β'-di(benzylmethylphenylammonio)diethylether, since the toxic hazards associated with the use in the rubber industry of bis-quarternary ammonium salts containing this type of cation is less than with bis-quarternary ammonium salts not containing these cations. These quarternary ammonium salts are new compositions of matter.

Other types of cations containing a plurality of quarternary groups are also of value. Polymers of amino compounds containing polymerisable olefin or other groups may be N-alkylated if necessary and then quaternised; as examples of such polymers there may be mentioned polymers of amino styrenes or of 1:2:2:4-tetraalkyl-1:2-dihydroquinolines. Alternatively quarternary ammonium compounds containing polymerisable groups may be polymerised. Polycondensation, such as polyester formation, may be carried out instead of polymerisation. Another type of cation containing a plurality of quaternary groups may be obtained from a bishalogen compound such as xylylenedichloride or bis-2:4-chloromethyl-4-alklyphenol and a compound containing one or more amino groups attached to an aromatic nucleus.

As anions which with the cation make up the quaternary ammonium salt there may be mentioned for example halogen, such as fluoride, bromide and iodide and especially chloride, nitrate, sulphate, phosphate, alkylsulphate such as methosulphate, alkanesulphonate, arylsulphonate such as p-toluenesulphonate, aralkylsulphonate, sulphamate, arylcarboxylate such as benzoate and salicylate, alkylcarboxylate such as acetate, oxalate, formate, thiocarbamate, and di-, tri-, and tetrathionates.

The quaternary ammonium salts suitable for use in the process of the invention may be prepared in general by any conventional method hitherto used for the preparation of quaternary salts. For example a suitable compound containing one or more tertiary amino groups may be interacted with an alkyl or aralkyl halide or other quaternising agent. The reagents are normally employed in equimolecular proportions but excess of either may be used if desired. The preparation of the salt may be carried out if desired in a solvent such as a hydrocarbon, chlorinated hydrocarbon, alcohol or other solvent conventionally used in the preparation of quaternary salts, in the absence or presence of water which in some cases has a catalytic effect. Other catalysts such as iodine, bromine, alkyl iodides or bromides or inorganic compounds containing halogens may be added if desired. Quaternisation may be carried out at any convenient temperature between 0° C. and 100° C. but higher or lower temperatures may be used if desired.

The quaternary ammonium salts may also be obtained by anion exchange by treating a quaternary ammonium salts, preferably a halide, with a salt such as an inorganic salt of the desired anion in an aqueous medium. These two procedures may be combined in one operation by carrying out the quaternisation reaction in presence of a salt of the desired anion. In an alternative procedure a quaternary ammonium salt such as a halide is converted, for example by treatment with silver oxide, into the hydroxide which is neutralised with the appropriate acid.

The amount of quaternary ammonium salt should be from 0.1 to 1.0% and preferably from 0.25 to 0.75% of the weight of the rubber, as at these concentrations there is only slight effect on cure although useful scorch retardation is obtained. In amounts above 1% the effect on cure is much more marked and in some cases leads to very low states of cure. The salt may be anhydrous or may contain water or other solvent of crystallisation.

The quaternary ammonium salt may be incorporated into the rubber by any conventional manner, for example on a two-roll mill or in an internal mixer, and is preferably added before or at the same time as the other ingredients but may be added after these.

The vulcanization of the rubber may be carried out by heating at the temperature conventionally used for this operation, and preferably at a temperature between 120 and 160° C. although higher or lower temperatures may be used if desired.

The rubber may also contain other known adjuvants for the manufacture of rubber compositions, for example fillers, reinforcing agents, antioxidants, antiozonants, waxes, blowing agents, pigments, zinc oxide, fatty acids and processing oils. Other retarding agents, for example acidic compounds such as salicylic acid or phthalic anhydride, nitrosoamines such as nitrosodiphenylamine, or bis diisopropylphosphoryldisulphide may also be present.

The process of our invention is of particular value when the rubber also contains carbon blacks, particularly furnace carbon blacks, since these rubber mixes are especially prone to scorch.

The invention is illustrated but not limited by the following examples in which all parts and percentages are by weight unless otherwise stated.

Example 1

Rubber mixes of the following formulation are compounded on an open roll mill and then tested for Mooney scorch at 120° C. by the method of British Standard No. 1673, part 3 (1951).

| | Parts |
|---|---|
| Smoked sheet natural rubber | 100 |
| Stearic acid | 3.0 |
| Zinc oxide | 3.5 |
| High Abrasion Furnace carbon black | 45 |
| Processing oil | 3.5 |
| Sulphur | 2.5 |
| N-cylclohexylbenzthiazyl sulphenamide | 0.5 |
| Additive | 0.5 |

| Additive: | Mooney scorch at 120° C., time to (minimum +10), minutes |
|---|---|
| None | 25 |
| N-nitrosodiphenylamine | 32 |
| Benzyldimethylphenylammonium chloride | 36 |
| Benzylethylmethylphenylammonium chloride | 37 |
| Benzyldiethylphenylammonium bromide | 36 |
| Diphenyldimethylammonium iodide | 28 |
| Dibenzylmethylphenylammonium bromide | 37 |
| p-Nitrobenzyldimethylphenylammonium chloride | 35 |
| Benzyldimethyltolylammonium chloride | 31 |
| Xylylenebisdimethylphenylammonium chloride | 33 |
| 1:1-bis[4-(N-benzyl-N:N-dimethylammonio)phenyl]methane dichloride | 32 |
| Benzyldimethylphenylammonium bromide | 36 |
| Benzyldimethylphenylammonium benzoate | 32 |
| Benzyldimethylphenylammonium phosphate | 33 |
| Benzyldimethylphenylammonium sulphate | 34 |
| Benzyldimethylphenylammonium sulphamate | 33 |

Example 2

The following rubber compounds are prepared on open-roll mills and tested for Mooney scorch.

| Mix | A | B | C |
|---|---|---|---|
| Smoked sheet natural rubber | 100 | | |
| Styrene/butadiene copolymer (A.S.T.M. 1500) | | 100 | |
| Oil extended styrene/butadiene copolymer (A.S.T.M. 1712) | | | 137.5 |
| Stearic acid | 3.0 | 1.5 | 1.5 |
| Zinc oxide | 3.5 | 3.5 | 3.5 |
| High Abrasion Furnace carbon black | 50 | 50 | 50.0 |
| Process oils | 4.0 | 8.0 | |
| Sulphur | 2.5 | 1.8 | 1.8 |
| N-cyclohexylbenzthiazylsulphenamide | 0.5 | 1.2 | 1.2 |
| Additive | 0 or 0.5 | 0 or 0.5 | 0 or 0.5 |

| Mix | Additive | Mooney Scorch | |
|---|---|---|---|
| | | Temperature of Test, ° C. | Scorch Time to (min. +10), minutes |
| A | | 120 | 25 |
| A | N-nitrosodiphenylamine | 120 | 32 |
| A | Benzyldimethylphenylammonium chloride | 120 | 36 |
| B | | 130 | 32 |
| B | N-nitrosodiphenylamine | 130 | 35 |
| B | Benzyldimethylphenylammonium chloride | 130 | 36 |
| C | | 130 | 32 |
| C | N-nitrosodiphenylamine | 130 | 33 |
| C | Benzyldimethylphenylammonium chloride | 130 | 34 |

Example 3

The following rubber compounds are prepared on an open roll mill, and tested for Mooney scorch at 140° C.

|  | Parts |
|---|---|
| A cold polymerised styrene butadiene copolymer masterbatched with 50 parts of Intermediate Super Abrasion Furnace carbon black, and containing 10 parts of an aromatic process oil | 160 |
| Stearic acid | 1.5 |
| Zinc oxide | 3.5 |
| Sulphur | 1.8 |
| tert.octylbenzylthiazylsulphenamide | 1.2 |
| Additive | 0 or 0.5 |

| Additive: | Mooney scorch at 140° C., time to (min.+10), minutes |
|---|---|
| None | 24 |
| N-nitrosodiphenylamine | 24.5 |
| Xylyldimethylphenylammoniumchloride | 28 |

Example 4

The following rubber compounds are prepared on an open roll mill and then tested for Mooney scorch at 120° C.

|  | Parts |
|---|---|
| Smoked sheet natural rubber | 100 |
| Stearic acid | 3.0 |
| Zinc oxide | 3.5 |
| High Abrasion Furnace black | 50 |
| Process oil | 4.0 |
| Sulphur | 2.5 |
| Accelerator system | 0.5 |
| Additive (benzyldimethylphenylammonium chloride) | 0 or 0.5 |

| Accelerator | Mooney Scorch at 120° C. time to (min.+10), minutes | |
|---|---|---|
|  | Without Additive | With Additive |
| N-cyclohexylbenzthiazyl sulphenamide | 27 | 38 |
| N-tert-octylbenzthiazyl-sulphenamide | 30 | 40 |
| Mercaptobenzthiazole | 12 | 16 |
| Diphenylguanidine | 24 | 47 |
| N-cyclohexylbenzthiazyl-sulphenamide, 0.4 Diphenylguanidine, 0.1 | 22 | 34 |
| N-cyclohexylbenzthiazyl-sulphenamide, 0.4 Tetramethylthiuramdisulphide, 0.1 | 15 | 20 |

Example 5

Rubber mixes are prepared as described in Example 1 and vulcanized for different times in a press at 141° C. and stress-strain properties determined on a Schopper tensile tester according to British Standard 903 part A2, 1956.

The results are as follows:

| Physical Property | Cure at 141° C. (minutes) | Retarder | | | |
|---|---|---|---|---|---|
|  |  | None | p-Xylydimethyl phenyl-ammonium chloride | N-nitrosodiphenylamine | Phthalic Anhydride |
|  |  |  | Concentration | | |
|  |  |  | 0.5 | 0.5 | 2.0 |
| Tensile strength (kg./cm.²) | 15 | 246 | 168 | 145 | 203 |
|  | 20 | 272 | 256 | 220 | 209 |
|  | 25 | 284 | 272 | 254 | 227 |
|  | 30 | 273 | 275 | 274 | 253 |
|  | 40 | 263 | 276 | 261 | 248 |
| Modulus at 300% elongation (kg./cm.²) | 15 | 121 | 56 | 77 | 65 |
|  | 20 | 145 | 110 | 100 | 120 |
|  | 25 | 158 | 130 | 126 | 135 |
|  | 30 | 166 | 145 | 133 | 160 |
|  | 40 | 161 | 153 | 135 | 163 |
| Elongation at Break (percent) | 15 | 480 | 535 | 430 | 450 |
|  | 20 | 470 | 500 | 475 | 435 |
|  | 25 | 460 | 495 | 480 | 430 |
|  | 30 | 435 | 465 | 475 | 400 |
|  | 40 | 420 | 460 | 455 | 405 |
| Mooney Scorch at 120° C. time to (min.+10) (minutes) |  | 24 | 38.5 | 30 | 27 |

Example 6

Rubber mixes of the following formulation are prepared on an open roll mill in the usual manner and are tested for Mooney scorch as described in Example 1. Samples of the mixes are vulcanized for diqerent times in a press at 141° C. and the stress-strain properties determined as described in Example 6.

|  | Parts |
|---|---|
| Pale crepe | 100 |
| Stearic acid | 1 |
| Zinc oxide | 10 |
| Blanc fixe | 75 |
| Sulphur | 2.5 |
| Accelerator | 0.8 |
| Retarder | 0 or 0.5 |

|  | Time of cure at 141° C. (mins.) | Accelerator System | |
|---|---|---|---|
|  |  | Mercapto benzthiazole No retarder | Mercapto benzthiazole and benzyl-dimethyl-phenyl-ammonium chloride |
| Tensile Strength (kg./cm.²) | 20 | 222 | 225 |
|  | 25 | 219 | 216 |
|  | 30 | 215 | 207 |
|  | 35 | 198 | 200 |
|  | 40 | 199 | 189 |
| Modulus at 500 (kg./cm.²) | 20 | 108 | 100 |
|  | 25 | 112 | 118 |
|  | 30 | 110 | 107 |
|  | 35 | 107 | 100 |
|  | 40 | 105 | 96 |
| Elongation at break | 20 | 670 | 685 |
|  | 25 | 665 | 685 |
|  | 30 | 635 | 635 |
|  | 35 | 630 | 630 |
|  | 40 | 640 | 610 |
| Mooney Scorch at 120° C. time to (minimum+10) |  | 10 | 14 |

Mixes in which the accelerator is N-cyclohexylbenzthiazylsulphenamide have a Mooney scorch at 130° C. of 23 minutes in absence of any retarder, but in the presence of benzyldimethylphenylammoniumchloride have a Mooney scorch at 130° C. of 32 minutes.

*Example 7*

Rubber mixes made according to the method described in Example 1 are compounded on an open roll mill and then tested for Mooney scorch at 120° C. by the method of British Standard No. 1673 part 3 (1951).

| Additive: | Mooney scorch at 120° C., time to (minimum+10), minutes |
|---|---|
| None | 25 |
| N-nitrosodiphenylamine | 32 |
| Anhydro - m-sulphonatobenzyl-p-formylphenyldimethyl ammonium hydroxide | 27 |
| Anhydro - m - sulphonatobenzyl-m-nitrophenyldimethylammonium hydroxide | 27 |
| Dibenzylmethylphenylammonium bromide | 34 |
| Diphenyldimethylammonium chloride | 34 |
| Benzyldimethylphenylammonium methosulphate | 38 |
| Trimethylene - 1:3 - bis(benzylmethylphenylammonium bromide) | 39 |
| Trimethylene - 1:3 - bis(benzylmethylphenylammonium chloride) | 39 |
| Benzyl - β-hydroxyethylmethylphenylammonium bromide | 38 |
| Benzyl - β-hydroxyethylmethylphenylammonium chloride | 39 |
| Benzyl-β-hydroxypropylmethylphenylammonium bromide | 36 |
| Benzyl-β-hydroxypropylmethylphenylammonium chloride | 36 |
| 1:1 - bis[4 - (N - benzyl-N:N-diethylammonio)phenyl]methane dichloride | 34 |
| 1:1 - bis[4 - (N-benzyl-N:N-dimethylammonio)phenyl]cyclohexane dichloride | 34 |
| Benzyl - (β - hydroxyethoxyethyl)methylphenylammonium chloride | 35 |
| m - Phenylene - bis(benzyldimethylammonium chloride) | 31 |
| Benzyldimethyl-m-nitrophenylammonium bromide | 30 |
| 2:2 - bis[4-(N-benzyl-N:N-dimethylammonio)-phenyl]propane dichloride | 36 |
| Di - [4 - (N-benzyl - N:N-dimethylammonio)-phenyl]carbinol dichloride | 32 |
| Benzyl - (β - hydroxyethoxyethyl)methylphenylammonium chloride | 35 |
| Benzyl - (β - hydroxypropoxypropoxypropyl)-methylphenyl ammonium chloride | 30 |
| 4:4':4"tris(benzyldimethylammoniophenyl)-methane trichloride | 31 |
| 4:4' - bis(benzyldimethylammoniophenyl) sulphide dichloride | 35 |
| 4:4'-di(benzyldimethylammonio)triphenylmethane dichloride | 36 |
| Anhydrobenzylmethylphenyl - β - sulphatoethylammonium hydroxide | 30 |
| N - 2[N' - methyl-N'-phenylaminoethyl]benzylmethylphenylammonium bromide | 32 |
| 1:2 - ethylene - bis[benzylmethylphenylammonium bromide] | 33 |
| 3:5 - di - tert.-butyl-2-hydroxybenzyldimethylphenylammonium chloride | 33 |

*Example 8*

The following rubber compounds are prepared on an open roll mill, and then tested for Mooney scorch at 130° C.

| | Parts |
|---|---|
| Cis polybutadiene | 100 |
| Stearic acid | 2 |
| Zinc oxide | 3 |
| High Abrasion Furnace black | 50 |
| Process oil | 5 |
| Sulphur | 1.75 |
| N-cyclohexylbenzthiazylsulphenamide | 0.9 |
| Additive | 0.5 |

| Additive: | Mooney scorch at 130° C., time to (minimum+10), minutes |
|---|---|
| None | 11 |
| N-nitrosodiphenylamine | 10 |
| Trimethylene - 1:3 - bis(benzylmethylphenylammonium chloride) | 15 |
| Benzyl - β - hydroxyethylmethylphenylammoniumchloride | 14 |

*Example 9*

15.2 parts of N-methyl-N-β-hydroxyethylaniline and 17.1 parts of benzyl bromide are mixed in 40 parts of ethyl acetate. After keeping for several days at room temperature the insoluble benzyl-β-hydroxyethylmethylphenylammonium bromide is filtered off. This crude product melts between 123 and 124° C. and, after crystallisation from a mixture of ethanol and ethylacetate, between 128 and 129° C.

Repetition of the above procedure using N-methyl-N-β-hydroxypropylaniline and benzyl bromide affords benzyl-β-hydroxypropylmethylphenylammonium bromide, melting between 124 and 125° C.

*Example 10*

A mixture of 15.1 parts of N-methyl-N-β-hydroxyethylaniline, 12.6 parts of benzyl chloride and 6.6 parts of water is stirred at a temperature between 45 and 50° C. for 40 hours. The water is then removed under a pressure of 15 mm. of mercury at a temperature between 45 and 50° C. leaving a stiff gummy product. 40 parts of acetone are added and stirring continued until the product is in the form of an insoluble powder which is collected by filtration, washed with acetone, and dried at a temperature not exceeding 50° C. The benzyl-β-hydroxyethylmethylphenylammoniumchloride so obtained melts between 115 and 116° C. The water used in the above reaction may be omitted if desired. It is advantageous to carry out the reaction under a nitrogen atmosphere and the yield is improved if the reaction mixture is seeded with solid benzyl-β-hydroxyethylmethylphenylammonium chloride at an early stage in the reaction.

By an analogous procedure using equivalent amounts of base and halide the following quaternary ammonium salts are prepared.

Benzyl-β-hydroxypropylmethylphenylammonium chloride, melting point indefinite, from N-methyl-N-β-hydroxypropylaniline and benzyl chloride.

Benzyl - (β-hydroxyethoxyethyl)methylphenylammonium chloride, a gummy solid, from N-methyl-N-β-hydroxyethoxyethylaniline and benzyl chloride.

Benzyl - (β - hydroxyethoxyethoxyethyl)methylphenylammonium chloride, a gummy solid, from N-methyl-N-β-hydroxyethoxyethoxyethylaniline and benzyl chloride.

Benzyl - (β - hydroxypropoxypropoxypropyl)methylphenylammonium chloride, a gummy solid, from N-methyl - N - β-hydroxypropoxypropoxypropylaniline and benzyl chloride.

*Example 11*

25.4 parts of benzyl chloride are added to a solution of 25.4 parts of 4:4'-tetramethyldiaminodiphenylmethane in 100 parts of ethanol at 50° C. The mixture is boiled under reflux for 16 hours and the ethanol removed under reduced pressure. The residue is dissolved in water and the aqueous solution washed with ether and evaporated under reduced pressure at a temperature between 45 and 50° C. to remove the water. The residue is treated with cold acetone, the acetone removed under reduced pressure, and the solid residue recrystallised from a mixture of butanol and ethyl acetate to give 1:1-bis[4-(N-benzyl-N:N - dimethylammonio)phenyl]methane dichloride, a sticky hygroscopic solid.

*Example 12*

A mixture of 12.7 parts of benzyl chloride, 17.25 parts of 4:4'-tetraethyldiaminodiphenylmethane and 50 parts of water is stirred at 50° C. for 2 days. The aqueous solution so obtained is cooled to room temperature, washed with ether, and evaporated at a temperature between 45 and 50° C. under reduced pressure to remove the water. 1:1-bis[4-(N-benzyl - N:N - diethylammonio)phenyl] methane dichloride, a very hygroscopic solid, is obtained.

By a similar procedure using the bases and halides listed are obtained the following quaternary salts:

1:1-bis[4-(benzyl-N:N-dimethylammonio)phenyl] - cyclohexane dichloride, melting between 95 and 96° C. from 1:1-bis(4-dimethylaminophenyl)cyclohexane and benzyl chloride, m-phenylenebis(benzyldimethylammonium chloride), from tetramethyl-m-phenylenediamine and benzyl chloride.

4.4.4'-tris(benzyldimethylphenyl)methane trichloride, from tris(p - dimethylaminophenyl)methane and benzyl chloride.

Trimethylene-1:3 - bis(benzylmethylphenylammonium chloride), melting between 169 and 171° C. from N:N'-dimethyl-N:N'-diphenyl-1:3-propylenediamine and benzyl chloride.

4:4' - bis(benzyldimethylphenylammonio)sulphide dichloride, hygroscopic solid melting between 72 and 75° C. from 4:4'-bisdimethylaminodiphenyl sulphide and benzyl chloride.

4:4' - bis(N-benzyl-N:N-dimethylammonio)triphenylmethane dichloride, a green solid, from 4:4'-dimethylaminotriphenylmethane and benzyl chloride.

*Example 13*

5.7 parts of dimethylaniline are added to a solution of 12.7 parts of 2-chloromethyl-4:6-ditert.-butylphenol in 40 parts of acetone. After keeping for 24 hours the insoluble 3:5 - ditert.-butyl-2-hydroxybenzyldimethylphenylammonium dichloride, melting between 108 and 109° C. is filtered off.

*Example 14*

A solution of 16.9 parts of silver nitrate in 100 parts of water is added to a solution of 26.7 parts of benzyldimethylphenylammonium chloride in 100 parts of water. After standing for several hours the slurry is filtered to remove insoluble silver chloride, and the filtrate evaporated at a temperature between 45 and 50° C. under reduced pressure. The residue is crystallised from ethanol to give benzyldimethylphenylammonium nitrate, melting between 156 and 157° C.

Repetition of the above procedure using an equivalent amount of silver sulphamate in place of the silver nitrate affords benzyldimethylphenylammonium sulphamate, melting between 123 and 124° C.

*Example 15*

17 parts of 32% aqueous sodium hydroxide solution are added to a solution of 27.6 parts of an 83.8% aqueous paste of N-methyl-N-β-hydroxyethyl-aniline sulphuric ester in 140 parts of water. To the solution so obtained are added with stirring at a temperature between 45 and 50° C. 12.6 parts of benzyl chloride. After stirring for 24 hours the gummy insoluble product is separated, washed with water and then with ether to give anhydrobenzylmethylphenyl-β-sulphatoethylammonium hydroxide as a pale green powder, melting at about 120° C.

A similar product is obtained if the benzyl chloride is replaced with 17.1 parts of benzyl bromide.

*Example 16*

15.3 parts of p-xylyldimethyuphenylammonium bromide is stirred with a suspension of 23.2 parts of silver oxide in 150 parts of water for 1 hour. The insoluble silver bromide is removed by filtration and washed with water, and the combined filtrate and washings neutralised with aqueous hydrochloric acid. The solution so obtained is evaporated under reduced pressure at a temperature between 45 and 50° C. to give p-xylyldimethylphenylammonium chloride, melting at about 93° C.

Using analogous procedures with equivalent amounts of quaternary ammonium salts are prepared.

Dimethyldiphenylammonium chloride, melting between 161 and 163° C. from dimethyldiphenylammonium iodide.

Benzyldimethylphenylammonium phosphate, a pale brown very hygroscopic solid, benzyldimethylphenylammonium sulphate, a very hygroscopic solid, and benzyldimethylphenylammonium benzoate, melting between 98 and 99° C. after crystallisation from a mixture of ethanol and ethyl acetate, all prepared from benzyldimethylphenylammonium chloride through the hydroxide which is then neutralised with phosphoric, sulphuric or benzoic acids respectively.

What we claim is:

1. In a process for the vulcanization of rubber which comprises heating rubber with sulfur or a sulfur-bearing substance, a vulcanization accelerator and a retarder;

the improvement in which the retarder is a quaternary ammonium salt wherein the quaternary nitrogen atom is connected (a) directly to a first aryl nucleus, (b) directly to a second aryl nucleus or through a methylene or methylene group substituted with alkyl group to said second aryl nucleus, (c) to two groups selected from the group consisting of unsubstituted alkyl, alkenyl, cycloalkyl and aralkyl groups and such groups substituted with a member of the class consisting of hydroxy, alkoxy, hydroxypolyalkenoxy, acetoxy, sulfonic acid, sulfato, carboxyl and hydroxyalkoxy or which are joined and together with the nitrogen atom form a heterocyclic ring, the amount of said retarder being between 0.1 and 1.0% of the weight of the rubber.

2. A process as claimed in claim 1 wherein a sulphenamide is used as accelerator.

3. A process as claimed in claim 2 wherein the rubber also contains furnace carbon blacks.

4. A process as claimed in claim 2 wherein the first aryl nucleus is a phenyl nucleus, and the second aryl nucleus is connected to the nitrogen atom through a methylene group.

5. A process as claimed in claim 2 wherein the nitrogen atom is connected to two groups each of which is selected from the group consisting of alkyl and substituted alkyl group, one of said groups being hydroxyalkyl.

6. A process as claimed in claim 2 wherein said retarder contains two quaternary nitrogen atoms linked by at least one member of the group consisting of aliphatic chains, aromatic rings, heteroatoms and combinations of these at least one of which nitrogen atoms is connected directly to first aryl nucleus and directly to a second aryl nucleus or through a methylene or methylene group substituted with alkyl group to said second aryl nucleus, and to two groups selected from the group consisting of unsubstituted alkyl, alkenyl, cycloalkyl and aralkyl groups or such groups substituted with a member of the class consisting of hydroxy, alkoxy, hydroxypolyalkenoxy, acetoxy, sulfonic acid, sulfato, carboxyl and hydroxyalkoxy or which are joined and together with the nitrogen atom form a heterocyclic ring.

7. A process as claimed in claim 6 wherein at least one quaternary nitrogen atom is attached directly to a phenyl nucleus and through a methylene group to a second phenyl nucleus and said quaternary nitrogen atoms are linked by a trimethylene chain.

8. Quaternary ammonium salts in which the quaternary nitrogen atom is attached
   (a) directly to a first aryl nucleus,
   (b) directly to a second aryl nucleus or through a methylene or methylene group substituted with alkyl group to said second aryl nucleus,
   (c) to a group selected from the group consisting of unsubstituted alkyl, alkenyl, cycloalkyl and aralkyl groups and such groups substituted with a member of the class consisting of hydroxy, alkoxy, hydroxypolyalkenoxy, acetoxy, sulfonic acid, sulfato, carboxyl and hydroxyalkoxy or which are joined and together with the nitrogen atom form a heterocyclic ring, and
   (d) to a $\beta$ (hydroxypolyalkenoxy) alkyl group.

9. Quaternary ammonium salts as claimed in claim 8 wherein the anion is chlorine.

10. Quaternary ammonium salts wherein the quaternary nitrogen atom is connected
    (a) directly to a first aryl nucleus,
    (b) directly to a second aryl nucleus or through a methylene or methylene group substituted with alkyl group to said second aryl nucleus,
    (c) to a group selected from the group consisting of unsubstituted alkyl, alkenyl, cycloalkyl and aralkyl groups and such groups substituted with a member of the class consisting of hydroxy, alkoxy, hydroxypolyalkenoxy, acetoxy, sulfonic acid, sulfato, carboxyl and hydroxyalkoxy or which are joined and together with the nitrogen atom form a heterocyclic ring, and
    (d) to a $\beta$-($\beta$-hydroxyalkoxy) alkyl group.

11. Benzyl - $\beta$ - hydroxyethylmethylphenylammonium salts.

References Cited
UNITED STATES PATENTS

| | | | |
|---|---|---|---|
| 1,871,037 | 8/1932 | Cadwell | 260—782 |
| 1,912,448 | 6/1933 | Harkins | 260—782 |
| 1,950,067 | 3/1934 | Sibley | 260—782 |
| 2,100,085 | 11/1937 | Newman | 260—782 |
| 2,535,857 | 12/1950 | Mathes et al. | 260—780 |
| 2,623,902 | 12/1952 | Crossley | 260—567.6 |
| 2,666,783 | 1/1954 | Lytton | 260—567.6 |
| 3,124,512 | 3/1964 | Schmid et al. | 260—567.6 |

OTHER REFERENCES

Wedekind, Mayer: "Berichte der Deutgchen Chemischen Gesellshaft," 42, 309.

"Beil Stein" Vierte Auflage, BAND 12, p. 1068.

JOSEPH L. SCHOFER, *Primary Examiner.*

D. DENENBERG, M. BERCH, *Assistant Examiners.*